(12) United States Patent
Chen et al.

(10) Patent No.: US 9,934,906 B2
(45) Date of Patent: Apr. 3, 2018

(54) ELECTRICAL DEVICE

(71) Applicant: BIOTRONIK SE & Co. KG, Berlin (DE)

(72) Inventors: Singjang Chen, Beaverton, OR (US); Daniel Loranger, Salem, OR (US)

(73) Assignee: BIOTRONIK SE & Co. KG, Berlin (DE)

( * ) Notice: Subject to any disclaimer, the term of this patent is extended or adjusted under 35 U.S.C. 154(b) by 224 days.

(21) Appl. No.: 14/561,909

(22) Filed: Dec. 5, 2014

(65) Prior Publication Data
US 2016/0163461 A1   Jun. 9, 2016

(51) Int. Cl.
*H01G 4/30* (2006.01)
*H01G 4/012* (2006.01)
*H01G 4/12* (2006.01)
*H01G 4/232* (2006.01)
*H01G 2/06* (2006.01)

(52) U.S. Cl.
CPC ............. *H01G 4/30* (2013.01); *H01G 4/012* (2013.01); *H01G 4/12* (2013.01); *H01G 4/232* (2013.01); *H01G 2/06* (2013.01)

(58) Field of Classification Search
CPC .. H01G 4/30; H01G 4/06; H01G 4/12; H01G 4/1227; H01G 4/248; H01G 4/10; H05K 1/02; H05K 1/81
See application file for complete search history.

(56) References Cited

U.S. PATENT DOCUMENTS

| | | | | |
|---|---|---|---|---|
| 8,174,816 B2* | 5/2012 | Seo | ......... | H01G 4/232 361/301.4 |
| 8,339,237 B2* | 12/2012 | Kajino | ................. | C01G 31/006 338/20 |
| 8,576,537 B2 | 11/2013 | Prymak | | |
| 2005/0094350 A1* | 5/2005 | Kobayashi | ............... | H01G 4/30 361/306.3 |
| 2011/0298578 A1* | 12/2011 | Feichtinger | ............. | H01C 7/10 338/20 |
| 2014/0301012 A1* | 10/2014 | Kim | ........................ | H01G 4/30 361/301.4 |

* cited by examiner

*Primary Examiner* — Nguyen Ha
(74) *Attorney, Agent, or Firm* — Buchanan Ingersoll & Rooney PC

(57) ABSTRACT

An electrical ceramic capacitor, in particular a multilayer ceramic capacitor, comprising a ceramic body including a stack of parallel metallic layers of opposing polarity separated by a dielectric material arranged in an active zone of the ceramic body enclosed between outer surfaces, wherein at one or more surfaces a shock-absorbing region is arranged.

3 Claims, 3 Drawing Sheets

ELECTRICAL DEVICE

TECHNICAL FIELD

The present invention relates to an electrical device and, in particular, to an electrical ceramic capacitor.

BACKGROUND

Ceramic capacitors are well known in the art. Multilayer ceramic capacitors ("MLCC") are frequently used as surface mounted devices ("SMD") because of their high package density. Typically, ceramic capacitors are manufactured by assembling a stack of green compact plates and conducting metal layers alternatingly, followed by sintering the stack to a compact sintered body. A first set of metal layers are electrically contacted by a first end terminal covering one side wall of the sintered body, and a second set of the metal layers are electrically contacted by a second end terminal covering another side wall, for instance, a side wall opposing the first side wall. The end terminals are intended as electrodes having different electrical polarities. The metal layers are arranged in an interdigital structure so that a metal layer contacting the first end terminal is facing a metal layer contacting the second end terminal, the metal layers being spaced apart by the dielectric ceramic plates. The metal layers spaced apart by the ceramic plates form an active zone of the capacitor with a well-defined capacitance.

However, capacitors made of ceramics are prone to cracks caused by mechanical shocks, and thermal shocks as well, which may destroy the device or alter the electrical properties of the capacitor. Often, cracks emerge at the outer surfaces and propagate to the active zone of the device. Thermal shock cracks and cracks due to flexing of a printed circuit board ("PCB") to which the capacitor is mounted are two of the extrinsic defects commonly occurring in multilayer ceramic capacitors. In addition, mechanically induced multiple cracks may occur in multilayer ceramic capacitors. These types of cracks have the same defect mechanisms in common. Firstly, mechanical stresses or forces are coupling through the ductile metal layers, and secondly, cracks occur in the underneath brittle ceramic capacitor layers. When these cracks propagate and cut through the active zone of the capacitor they may lead to electrical failures of the device.

In U.S. Pat. No. 8,576,537 a ceramic capacitor is described, where crack mitigation void patterns are provided close to the surface of the ceramic body. The crack mitigation void pattern is intended to channel emerging cracks, which originate from the surface and propagate into the ceramics body in a safe zone outside the active capacitor zone inside the ceramic body.

The present invention is directed toward overcoming one or more of the above-mentioned problems.

SUMMARY

It is an object of the present invention to provide a ceramic capacitor where crack propagation is strongly reduced or minimized.

At least this object is achieved by the features of the independent claim(s). The other claims, the drawings and the specification disclose advantageous embodiments of the present invention.

An electrical ceramic capacitor is proposed, in particular, a multilayer ceramic capacitor, comprising a ceramic body including a stack of parallel conducting layers of opposing polarity separated by a dielectric material arranged in an active zone of the ceramic body enclosed between outer surfaces, wherein at one or more surfaces a shock-absorbing region is arranged.

Advantageously, the top and/or bottom regions of the ceramic capacitor serve as a mechanical shock or stress absorber to stop crack propagation into the ceramic layers in the active zone of the capacitor body. In case mechanical stress is coupled through the end termination metal layer, a crack would be started at the interface of metal and these top and/or bottom regions and the mechanical stress would be absorbed and diminished in these regions. The shock-absorbing region is configured to crack easily, thus stopping crack propagation into the ceramic body.

Favorably, current ceramic capacitor manufacturing processes can be easily adapted, with only minor changes in the formulation of the ceramic green parts or ceramic green tapes before the ceramic body is sintered to form a monolithic capacitor body.

According to an advantageous embodiment, the shock-absorbing region may comprise one or more shock-absorbing layers. In particular, the one or more shock-absorbing layers may be are arranged as top surface layers. Favorably, at one or more surfaces a stack of at least two shock-absorbing layers may be arranged. Favorably, the shock-absorbing layer can be manufactured having a thickness in the range between 2 µm to 15 µm, preferably 5 µm to 10 µm, for example.

According to an advantageous embodiment, the shock-absorbing region is configured to comprise a higher porosity than the active zone. Preferably, the shock-absorbing layers of the shock-absorbing region are configured to comprise a higher porosity than the dielectric layers in the active zone. For instance, a higher porosity may be generated by a higher concentration of an organic binder agent in the formulation of green part or green tapes before sintering the material. Favorably, the shock-absorbing region may be manufactured from a green part comprising a higher concentration of organic binder agent than the active zone dielectric ceramic materials below the shock-absorbing region or between the shock-absorbing regions. Preferably, the shock-absorbing layers are manufactured from a green tape comprising a higher concentration of organic binder agent than the dielectric layers in the active zone below the shock-absorbing region or between the shock-absorbing regions comprising the shock-absorbing layers. In particular, the concentration of organic binder agent in a green part or green tapes forming the shock-absorbing region may be at least 2 wt. %, and preferably at least 3 wt. %, greater than the concentration of organic binder agent in a green part or green tapes forming the active zone.

According to an advantageous embodiment, the shock-absorbing region may be configured to be more brittle than the active zone, which may comprise dielectric ceramic materials. For instance, an increase in brittleness may be achieved by adding glass powder in the formulation of ceramic green part or green tapes before sintering the material. Favorably, the shock-absorbing region or shock-absorbing layers may be manufactured from a green part or a green tape comprising a higher concentration of glass powder than the active zone or the dielectric layers in active zone below the shock-absorbing region or between the shock-absorbing regions. In particular, the concentration of glass powder in a ceramic green part or green tape forming the shock-absorbing region or shock-absorbing layers may be in a range of 5 wt. % to 55 wt. %, and preferably at least 10 wt. % to 50%. For instance, the glass powder may contain at least one of iron oxide, chromium, manganese oxide and cobalt. Adding glass powder to the ceramic green part or ceramic green tape is only a minor change to the formulation of the ceramic green part or ceramic green tape and does not overly alter the manufacturing process.

According to an advantageous embodiment, the shock-absorbing region or shock-absorbing layers may be configured to comprise a distinct color. This may be achieved by adding colorized glass powder. Green glass powder contains iron oxide and chromium. Black glass powder contains manganese dioxide. Blue glass powder contains cobalt. Beneficially, by using colorized glass powder to the ceramic green parts or ceramic green tapes forming the shock-absorbing region or shock-absorbing layers, the top and bottom surface of the ceramic capacitor may be easily distinguishable from the front and back surfaces, in particular, when the top and bottom surfaces are manufactured with different colors than the front and back surfaces. In automated processes where the capacitors are mounted to a substrate by pick and place machines or the like, automated optical identification is possible via optical means such as, for example, a camera. Placement of the capacitor with the shock-absorbing layers in correct orientation can be ensured, thus protecting the capacitor from external thermal mechanical shocks and/or stress induced by printed circuit board ("PCB") flexing.

It is of advantage to combine an increase in porosity and increase of brittleness for forming the top and bottom shock-absorbing regions in the capacitor. The quality and shock tolerance of the resulting capacitor can be increased further.

According to an advantageous embodiment, the shock-absorbing regions, which are preferred at the top or the bottom of the capacitor, may have a thickness in the range of 5 μm to 10 μm, for example.

The present invention allows for providing high quality capacitors for small packages, for instance, for 0201 packages (inch code, i.e., 0603 in metric code) or even smaller. The inventive capacitors are immune to the failure modes described previously, virtually without increasing manufacturing costs. DC leakage current and other failures (due to cracks) can be reduced resulting in reduced rework and scrap costs, and increased reliability.

Further features, aspects, objects, advantages, and possible applications of the present invention will become apparent from a study of the exemplary embodiments and examples described below, in combination with the Figures, and the appended claims.

DESCRIPTION OF THE DRAWINGS

The present invention together with the above-mentioned and other objects and advantages may best be understood from the following detailed description of the embodiments, but not restricted to the embodiments, wherein is shown in.

DETAILED DESCRIPTION

Figure 1:
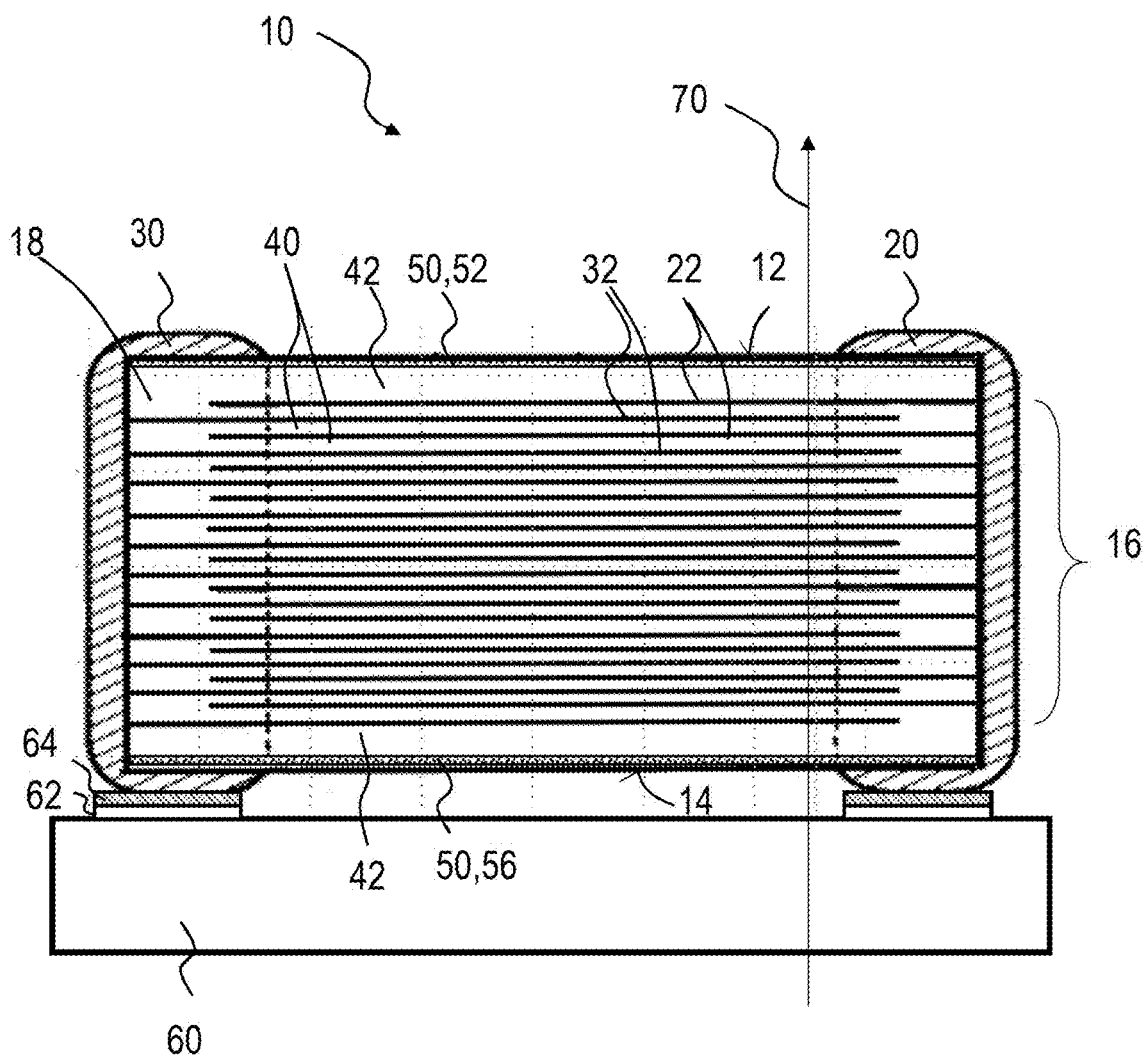
FIG. 1 in a cut view a multilayer ceramic capacitor mounted to a printed circuit board ("PCB") according to a first embodiment of the present invention.

In the drawings, like elements are referred to with equal reference numerals. The drawings are merely schematic representations, not intended to portray specific parameters of the present invention. Moreover, the drawings are intended to depict only typical embodiments of the present invention and therefore should not be considered as limiting the scope of the present invention.

FIG. 1 depicts an embodiment of the present invention in a cut view of a multilayer ceramic capacitor 10 mounted as an SMD capacitor to a substrate 60 such as a printed circuit board. The bottom side of the capacitor 10 is attached with its metallic end terminals 20, 30 to conducting pads 62 by solder 64. The end terminals 20, 30 cover side walls of the capacitor 10 and grip around the edges of the ceramic body 18 of the capacitor 10, thus covering edge regions on the top side 12 and bottom side 14.

The capacitor 10 comprises a body 18 having a top shock-absorbing layer 52 and a bottom shock-absorbing layer 56 forming shock-absorbing regions 50 at the top side 12 and the bottom side 14. An active zone 16 is arranged between the top and bottom shock-absorbing regions 50 separated from the shock-absorbing regions 50 by dielectric 42 at the top and at the bottom of the ceramic body 18. The active zone 16 is composed, as is well-known in the art, by a stack of alternating metal layers 22, 32 connected to the first end terminal 20 and second end terminal 30, respectively. The metal layers 22, 32 serve as electrodes of the capacitor 10. Each metal layer 22 connected to the first end terminal 20 is followed by a metal layer 32 connected to the second end terminal 30 in stack direction 70 and separated from each other by a dielectric 40. Only a few of the metal layers 22, 32 and the dielectric 40 are denoted with reference numerals for clarity reasons.

The dielectric 42 between the shock-absorbing regions 50 and the active zone 16 may be the same material as for the dielectric 40.

The shock-absorbing layers 52, 56 of the shock-absorbing regions 50 are configured to be prone to cracks. The layers 52, 56 may be prepared with a high porosity or with a high brittleness, or with a high porosity and a high brittleness. These layers 52, 56 serve as mechanical shock or stress absorbers and crack stoppers.

In case mechanical stress is coupled through the metal layers of the end terminals 20, 30, a crack would start at the interface between metal and the shock-absorbed in the top or bottom shock-absorbing region 50, i.e., in the top or bottom shock-absorbing layers 52, 56, and then propagate into these top or bottom layers 52, 56. As a result, the mechanical stress is relaxed and diminished, and the crack is contained or stopped at these top or bottom layers 52, 56.

The current ceramic capacitor manufacturing process known in the art can be maintained with only minor changes in the formulation for the top and bottom layers 52, 56, such as higher concentration of binder agent for a more porous material, or adding of glass powder for increasing brittleness, thus making the layers 52, 56 porous and brittle and, hence easy to crack.

The shock-absorbing layers 52, 56 of the shock-absorbing region 50 can be manufactured in a range of thickness between, for example, 5 μm to 10 μm. Such shock-absorbing regions 50 can easily be added to a ceramic capacitor design having a ceramic layer thickness of 50 μm on both sides of the active zone 16 of the capacitor 10. This allows for application of the inventive shock-absorbing regions 50 in highly miniaturized capacitors 10 such as so called 0805 type SMD capacitors, having EIA-standard dimensions of a length of 0.079±0.006 inches and a width of 0.050±0.006 inches.

Figure 2:
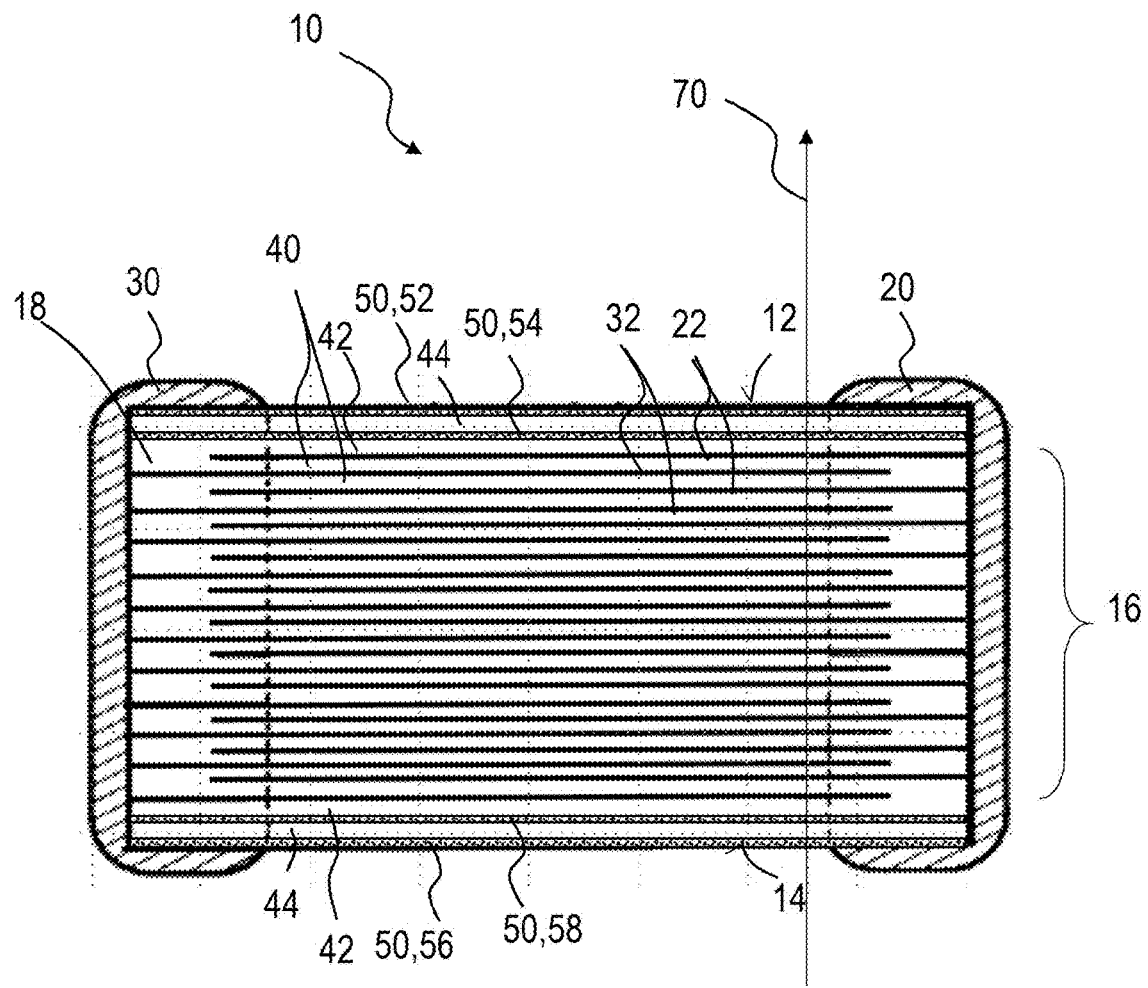
FIG. 2 in a cut view a multilayer ceramic capacitor according to a further embodiment of the present invention.

FIG. 2 illustrates an embodiment where two shock-absorbing layers 52, 54 and 56, 58 are arranged at the top and the bottom side 12, 14 each of the capacitor body 18. The bottom side 14 of the capacitor 10 may be attached with its metallic end terminals 20, 30 to a printed circuit board (not shown), such as displayed in FIG. 1. The end terminals 20, 30 cover side walls of the capacitor 10 and grip around the edges of the ceramic body 18 of the capacitor 10, thus covering edge regions on the top side 12 and bottom side 14.

The capacitor 10 comprises a body 18 having two top layers 52, 54 and two bottom layers 56, 58 forming shock-absorbing regions 50 at the top side 12 and the bottom side 14, each of the layers 52, 54 and 56, 58 being spaced from each other by a dielectric 44.

An active zone 16 is arranged between the top and bottom shock-absorbing regions 50 and separated from the shock-absorbing regions 50 by dielectric 42 at the top and at the bottom of the ceramic body 18. The active zone 16 is composed, as is well-known in the art, by a stack of alternating metal layers 22, 32 connected to the first end terminal 20 and second end terminal 30, respectively. The metal layers 22, 32 serve as electrodes of the capacitor 10. Each metal layer 22 connected to the first end terminal 20 is followed by a metal layer 32 connected to the second end terminal 30 in stack direction 70 and separated from each other by a dielectric 40. Only a few of the metal layers 22, 32 and the dielectric 40 are denoted with reference numerals for clarity reasons.

The dielectric 44, as well as the dielectric 42 between the shock-absorbing regions 50 and the active zone 16, may be the same material as for the dielectric 40.

The shock-absorbing layers 52, 54 and 56, 58 of the top and bottom shock-absorbing regions 50 are configured to be prone to cracks. The layers 52, 54 and 56, 58 may be prepared with a high porosity or with a high brittleness, or with a high porosity and a high brittleness. These layers 52, 54 and 56, 58 serve as mechanical shock or stress absorbers and crack stoppers.

In case mechanical stress is coupled through the metal layers of the end terminals 20, 30, a crack would start at the interface between metal and the shock-absorbed in the shock-absorbing region 50, i.e., in the top or bottom shock-absorbing layers 52, 56, and then propagate into these top or bottom layers 52, 56. The additional layers 54, 58, sandwiched between the outer shock-absorbing layers 52, 56 and active zone 16 inside the ceramic body 18, provide additional protection for the capacitor in case a crack may nevertheless propagate beyond the outer shock-absorbing layers 52, 56.

As a result, the mechanical stress is relaxed and diminished, and the crack is contained or stopped at these top or bottom layers 52, 54 and 56, 58.

The current ceramic capacitor manufacturing process known in the art can be maintained with only minor changes in the formulation for the top and bottom layers 52, 54 and 56, 58, such as higher concentration of binder agent for a more porous material, or adding of glass powder for increasing brittleness, thus making the layers 52, 56 porous and brittle and, hence easy to crack.

The shock-absorbing layers 52, 54 and 56, 58 of the shock-absorbing region 50 can be manufactured in a range of thickness between, for example, 5 μm to 10 μm. Such shock-absorbing regions 50 can easily be added to ceramic capacitor design having a ceramic layer thickness of 50 μm on both sides of the active zone 16 of the capacitor 10. This allows for application of the inventive shock-absorbing regions 50 in highly miniaturized capacitors 10 such as so called 0805 type SMD capacitors, having EIA-standard dimensions of a length of 0.079±0.006 inches and a width of 0.050±0.006 inches.

In the embodiments depicted FIGS. 1 and 2, the capacitor 10 is shown with a body 18 having rectangular edges. It should be understood that in other embodiments the edges of body 18 may be rounded instead of rectangular.

Figure 3:
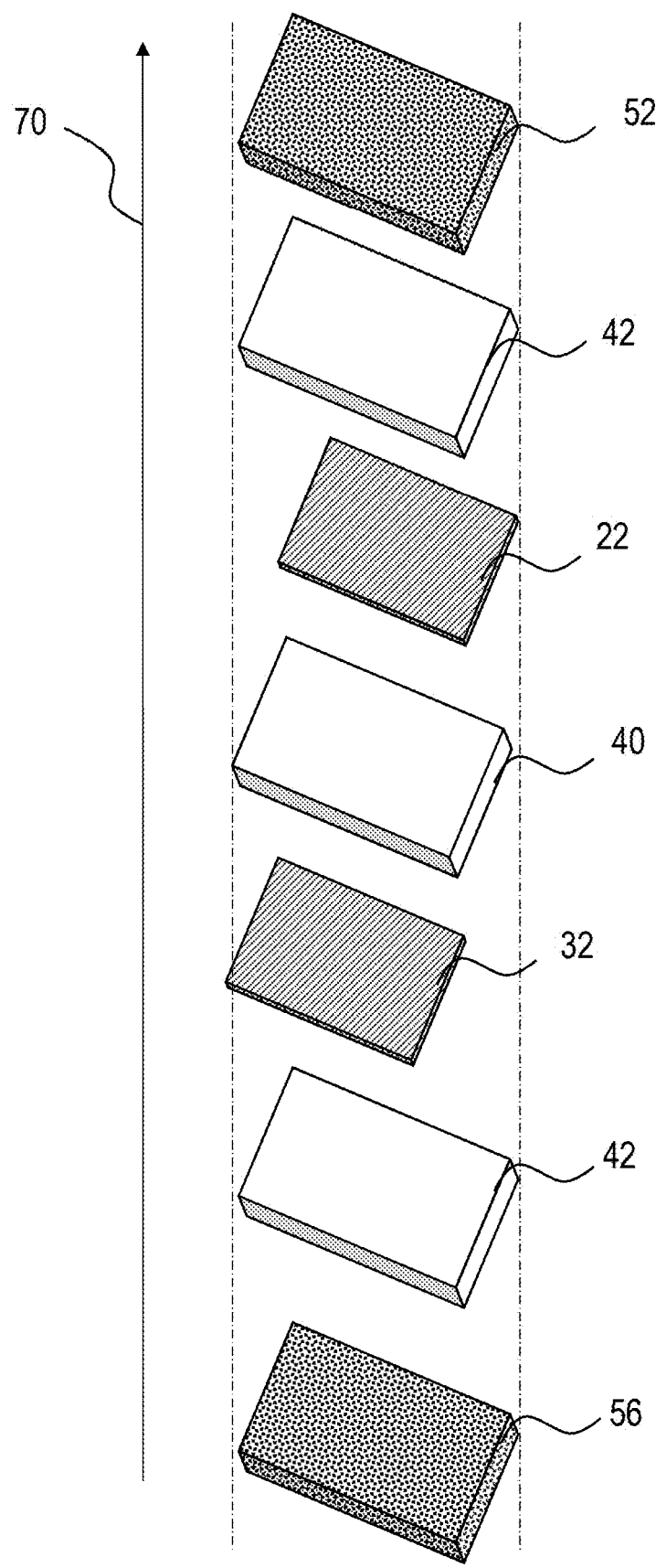
FIG. 3 is an exploded view green tape of a capacitor with single shock-absorbing layers as top and bottom layers.

FIG. 3 illustrates an assembly of a multilayer ceramic capacitor before sintering the assembly to form a monolithic body to which end terminals are attached at side walls. In general, manufacturing processes can be used which are well known in the art in accordance with standard practice for MLCC manufacture. By way of example, basic manufacturing steps are elaborated in U.S. Pat. No. 8,576,537. However, other standard manufacturing methods can be used as well.

The reference numerals refer to the components of the capacitor 10 in FIG. 1, although the ceramic components are green parts or green tapes before a sinter step.

Along a stacking direction 70, a shock-absorbing layer 56 (green tape) is covered with a dielectric layer 42 (green tape) on top of which a metal layer 32 is placed. A green tape of dielectric 40 is mounted on top of metal layer 32, followed by metal layer 22. Metal layer 32 is intended to connect to an end terminal (not shown) at one side wall of the capacitor body after sintering (at the left side in the Figure). Metal layer 22 is intended to connect to an end terminal (not shown) at an opposing side wall of the capacitor body after sintering (at the right side in the Figure). Both metal layers 22, 32 overlap except for a region at the outer edges of the layers 22, 32. On top of metal layer 22 a dielectric layer 42 is arranged and topped by a green tape shock-absorbing layer 52.

The metal layer 22, dielectric 40 and metal layer 32 serve as active zone in the sintered capacitor. In the Figure, only two metal layers 22, 32 spaced by dielectric 40 are shown. It is to be understood, that a multitude of such metal layers 22, 32 and dielectric 40 can be provided depending on a desired capacitance of the capacitor.

These shock-absorbing layers 52, 56 are preferably a dielectric ceramic having a higher content of organic binder agent in order to achieve a porous layer after the sintering step. Alternatively or additionally, a glass powder can be added to achieve a brittle material after the sintering step.

Dielectric 42 may be the same material as dielectric 40. Metal layers 22, 32 may comprise nickel alloy, silver, platinum and the like.

Besides the higher content of binder agent and/or additional glass powder, the composition of the base layers 52, 56 may be the same as for the dielectric 40, 42. Favorably, the content of organic binder agent in the base layers 52, 56 is at least 2 wt. %, and preferably at least 3 wt. %, higher than for the dielectric layers 40, 42. For glass powder, 10 wt. % to 50 wt. % of glass powder, such as regular soda-lime-silica glass is preferred.

Advantageously, the glass powder can be colorized which allows an easier alignment of the capacitor as well as an automated optical detection of top and bottom side of the capacitor.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range.

We claim:

1. An electrical ceramic capacitor, in particular a multilayer ceramic capacitor, comprising:
    a ceramic body including a stack of parallel metallic layers of opposing polarity separated by a dielectric material arranged in an active zone of the ceramic body enclosed between outer surfaces, wherein at one or more surfaces a shock absorbing region is arranged,
    wherein the shock absorbing region comprises one or more shock absorbing layers, and
    wherein the shock absorbing region is manufactured from a green part comprising a higher concentration of organic binder agent than the active zone below the shock absorbing region or between the shock absorbing regions, and wherein the shock absorbing layers are manufactured from a green tape comprising a higher concentration of organic binder agent than the dielectric layers in the active zone below the shock absorbing region or between the shock absorbing regions comprising the shock absorbing layers.

2. The capacitor according to claim 1, wherein the concentration of organic binder agent in the green part or green tape forming the shock absorbing region or shock absorbing layers is at least 2 wt. % greater than the concentration of organic binder agent in a green part forming the active zone or the green tape the dielectric layers forming the active zone.

3. The capacitor according to claim 1, wherein the concentration of organic binder agent in the green part or green tape forming the shock absorbing region or shock absorbing layers is at least 3 wt. % greater than the concentration of organic binder agent in a green part forming the active zone or the green tape the dielectric layers forming the active zone.

* * * * *